United States Patent [19]

Suda

[11] 3,940,187
[45] Feb. 24, 1976

[54] ANTIFRICTION BEARING FOR SLIDING MEMBERS

[76] Inventor: Minoru Suda, 220, Ooto, Yono, Saitama, Japan

[22] Filed: July 18, 1974

[21] Appl. No.: 489,546

[52] U.S. Cl. .............................. 308/6 C; 308/6 C
[51] Int. Cl.² ........................................ F16C 17/16
[58] Field of Search .................................. 308/6 C

[56] References Cited
UNITED STATES PATENTS

| | | | |
|---|---|---|---|
| 3,265,449 | 8/1966 | Jahn | 308/6 C |
| 3,767,276 | 10/1973 | Herr | 308/6 C |
| 3,808,839 | 5/1974 | Teramachi | 308/6 C X |
| 3,844,628 | 10/1974 | McCloskey | 308/6 C |

Primary Examiner—M. Henson Wood, Jr.
Assistant Examiner—Gene A. Church
Attorney, Agent, or Firm—Stevens, Davis, Miller & Mosher

[57] ABSTRACT

An antifriction bearing bush which includes a thin cylindrical outer sleeve, a cylindrical ball retainer, and balls. The outer sleeve has an end wall and at least three equidistant axially extending convex portions formed on the inner surface thereof except for one end. The cylindrical ball retainer fits within the thin cylindrical outer sleeve and has at least three axially oblong grooves on the outside thereof. The oblong grooves are composed of two straight sections and two curved sections. One of the straight sections and an adjacent portion of each curved section is cut completely through the ball retainer. The straight section has extended straight sectional grooves reaching the ends of the cylindrical ball retainer. The depth of the straight sectional grooves are complementary to the convex portions on the outer sleeve. Two segments of the convex portion of the outer sleeve which overlie the ends of the straight section of the ball retainer are of less convexity than the remainder of the convex portion. The balls within one portion of the oblong grooves contact the convex portion and simultaneously extend beyond the inner surface of the ball retainer. Balls within the remaining portion of the oblong grooves are enclosed by the ball retainer and the outer sleeve. A circular groove is within the end of the sleeve not having an end wall to retain the ball retainer within the sleeve.

4 Claims, 15 Drawing Figures

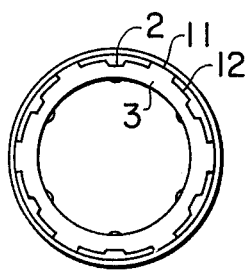
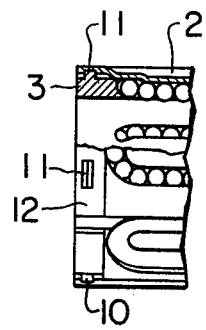
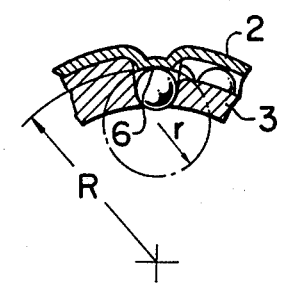
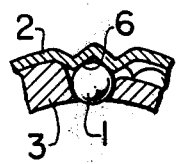
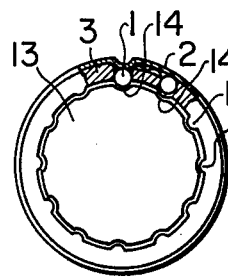
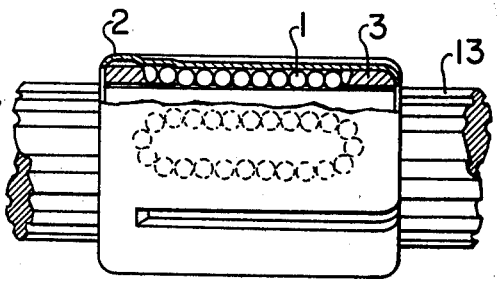
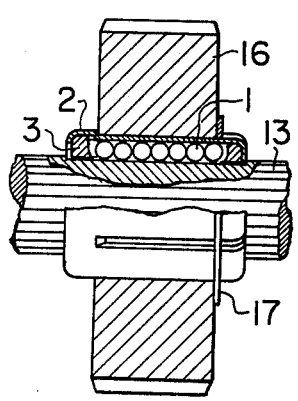
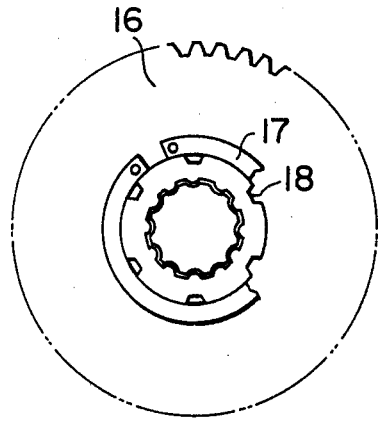

1

ANTIFRICTION BEARING FOR SLIDING MEMBERS

The invention relates to a bush or bearing assembly supporting or guiding a shaft for linear motion, as required in many machines. In this case, many balls are arranged so that they circulate axially in bearing contact with the bush and the shaft, along three or more circumferentially spaced portions of the inner surface of the bush.

The purpose of the invention is to develop the uses of these kinds of bushes with the simplest possible construction, and with a higher performance than existing kinds of bushes. In other words, it is characteristic of these kinds of bushes that the many balls which are between the shaft and the bush, roll and circulate under a load, and so it is important to provide a means of circulating these balls as simply as possible in respect of construction. Usually, the means of circulating such balls is constituted in such a way as to provide three or more ball circulating grooves, which are situated on the outer surface of the inner sleeve, with corresponding axially extending convex portions which are situated circumferentially on the inner surface of the outer sleeve, in three or more positions respectively. Therefore, if the outer sleeve is provided with a thick cylindrical metal bush, it is every difficult to shape the axially extending convex portions with precision, because the shape of the said convex portions is not simple. And when the outer sleeve is provided with a thin cylindrical metal bush, the construction of the said ball circulating paths is exceptionally difficult, and so linear motion antifriction bushes with a high performance cannot be realized.

In the case of this invention, the problems requiring solution in the art of constitution of the said existing bushes are generally solved, and the performance and the productivity of the bearing bushes are much improved.

The present invention will be described in further detail by reference to the attached drawing, in which;

FIGS. 8 and 9 show the third embodiments in which the axial positioning means can be applied to the bearing bush of the invention, between the outer sleeve and the ball retainer;

FIGS. 10 and 10' are a detail view indicating an axially sectional form of inner periphery of outer sleeve according to the invention with respect to axial convex parts and indicating balls contacting condition to the axial convex parts;

FIGS. 11 and 12 are an elevation view in partial section and a side elevation view in partial section in which the bearing has been arranged in groove form to the axial convex parts in the inner periphery of outer sleeve and balls contacting surface at the outer surface of shaft fitted with the bearing; and FIGS. 13 and 14 are a sectional view and a side elevation view in which ball bearing according to the invention has been applied to the rotational driving shaft for a gear as the ball spline.

Figure 1:
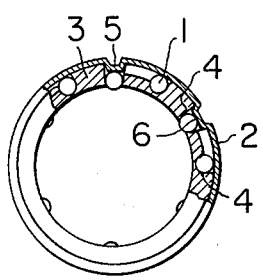
FIG. 1 is a partially transverse section view of the antifriction bearing according to the invention.
Figure 2:
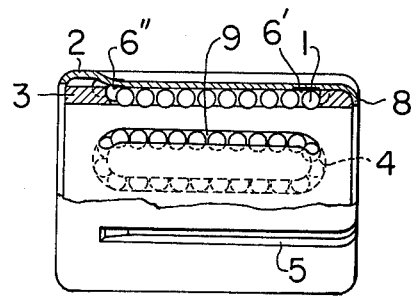
FIG. 2 is a partially longitudinal sectional side view of the antifriction bearing according to the invention.
Figure 3:
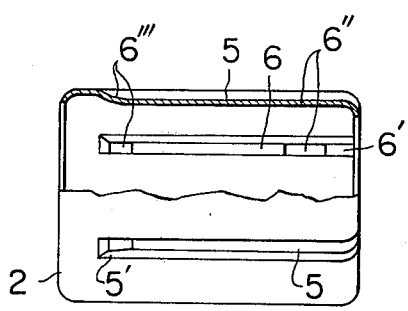
FIG. 3 is a partially transverse sectional view of the outer sleeve of antifriction bearing according to the invention.
Figure 4:
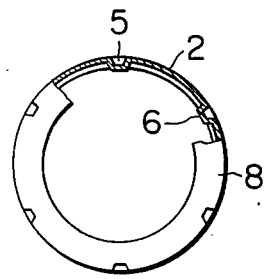
FIG. 4 is a partially longitudinal sectional side view of the outer sleeve.

As is shown in FIGS. 1 and 2, the antifriction bush of the invention consists of the ball 1, the outer sleeve 2, and the ball retainer 3. The outer sleeve 2, as shown in FIGS. 3 and 4, has a thin cylindrical form having radially constant thickness, and the ball retainer 3, shown in FIGS. 5 and 6, has a thick cylindrical form. Thus the antifriction bearing bush of the invention consists of a ball retainer 3 having many balls in the guide grooves 4, fitting into the sleeve 2, and the outer sleeve 2, shown in FIGS. 3 and 4, has axially extending concave portions 5 on the outer surface and converse axially extending convex portions 6 on the inner surface, except on the axial end. The retainer 3, shown in FIGS. 5 and 6, has the axially extending concave grooves 7 on the outer surface. This outer sleeve 2 and retainer 3 are fitted together with the convex portions 6 of the outer sleeve 2 against the concave portions 7 of the retainer 3. Thus the outer sleeve 2 and retainer 3 are mutually fitted in a circumferential direction precisely and firmly.

Figure 6:
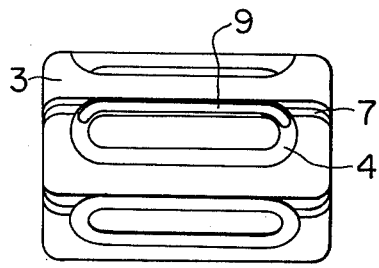
FIG. 6 is a partially longitudinal sectional view of the ball retainer.

The exact location between the outer sleeve 2 and the ball retainer 3 in the radial direction is obtained precisely by the clearance-less fitting of the outer sleeve 2 and the retainer 3, excluding the ball circulating grooves of the outer surface of the retainer 3. In the axial direction, the location is also easily obtained by means of a side wall 8, shown in FIGS. 2 and 4, which is formed during press working of the outer sleeve 2, and by the usual technique of clamping on the other axial end side of the outer sleeve 2, after the fitting of the outer sleeve and the retainer has been completed. As for the bearing bush of the invention with the said construction, the many balls which are provided in the ball circulating ways, are simultaneously in bearing contact with the axially extending convex portions of the inner surface of the outer sleeve 2, and with the shaft fitted to the bearing bush, within the axially extending apertures 9, as shown in FIGS. 2 and 6, on one straight range side of the elliptical or oblong guide grooves which are provided on the outer surface of the retainer. The balls, after supporting the radial load of the bearing bush in rolling contact, are released from the simultaneous bearing contact with the axially extending convex portions of the outer sleeve and the shaft fitted into the bush, within the curved portions of the said oblong guide grooves by the raised portions 6" and 6''', shown in FIG. 3, which are shaped axially on both sides of the said axially extending convex portions 6.

The following description of the invention will clarify the constructional features of the bearing bush.

In the antifriction bearing bush of the invention, the outer sleeve consists of a thin cylindrical shape of radially constant thickness, and the axially extending convex portions 6, shown in the accompanying drawings, are located on the inner surface of the said outer sleeve. In this way, it is possible to provide paths for the circulating balls without difficulty, and also to realise the many constructional features of the bearing bush as follows. In existing kinds of bearing bushes with a thick cylindrical outer sleeve, the axially extending convex portions of the inner surface of the outer sleeve must be shaped in such a way that the ball circulating guide ways using the appropriate ball retainer must be made from plates, or from a thick or thin cylindrical inner sleeve together with the said outer sleeve, and the said axially extending convex portions are formed by cutouts on the inner side of the thick cylindrical outer sleeve except for the said axially extending convex portions, or by radially pressing the outer surface of the outer sleeve in an axial direction within a suitable range. In addition to this, the axially extending convex portions of the inner surface of the thick cylindrical outer sleeve are formed by drawing, using the appropriate die provided with the work piece for a thick cylindrical pipe, or by the forging of cylindrical work piece.

By the said methods of working used in the thick cylindrical work piece, the axially extending convex portions of the inner surface of the outer sleeve are easily provided so as to have radially different thicknesses in the direction of the circumference, since the thickness of the cylindrical outer sleeve is sufficient to provide the said convex portions of the outer sleeve. In the case where the said convex portions of the inner surface of the outer sleeve are formed by press working, the decrease in accuracy of the shape, (for example irregularity in the roundness, cylindrical inaccuracy and so on) caused by the press working, can be corrected by the metal-cutting process.

But as regards the accuracy of the shapes and dimensions of the outer sleeve in bearing bushes of these types, (that is first the roundness and the cylindrical accuracy of the outer surface and of the cylindrical surface which is simultaneously in contact with the said axially extending convex portions of the inner surface, and secondly, the concentricity of the said cylindrical surface in contact with the convex portions of the inner surface for the outer surface, and thirdly the accuracy of the shape of the said convex portions of the inner surface etc.) must be maintained at the highest level. To achieve this, the outer sleeve must be ground at the outer surface and at the axially extending convex portions of the inner surface, with the utmost precision, after the quenching and the annealing. But on the thick cylindrical outer sleeve, the deformations which are due to the circumferentially uneven thickness or the residual stresses of the press working, are by no means small after the quenching and the anealing process, and it is difficult to achieve the required degree of accuracy within permissible limits by means of the said grinding process.

Accordingly, because of such difficulties in making the outer sleeve from a thick cylindrical work piece, and because of the need for economical efficiency of operation etc, attempts are at present being made to make a thin cylindrical outer sleeve. The thin cylindrical sleeve can be made by deep drawing from a thin plate having constant thickness, and also by using very accurate tools (punch and die). By such deep drawing, the thickness of the thin cylindrical outer sleeve is achieved with the most precise uniformity, and when the bearing bush is fitted into the very precise housing in contact with the outer surface of the bearing bush, and when the highly precise working shaft is fitted into the bearing bush without any clearance, the accuracy of the shape and in the dimension of the outer sleeve of the bearing bush is obtained with great precision, as regards accomodation in the housing hole or the shaft. In particular, great accuracy in the shapes of the said thin cylindrical outer sleeve, which are obtained by the fitting to the housing hole or the working shaft, can also be expected, when the heat treatment of the cementation and the quenching of the said thin cylindrical outer sleeve is made after the press work. In this way, it is possible to omit the grinding work of the inner and outer surfaces for the thick cylindrical outer sleeve on the bearing bush following the heat treatment. But on the said thin cylindrical outer sleeve, it is impossible or very dificult to provide the said axially extending convex portions of the inner surface of the outer sleeve (which are necessary to circulate the balls in the bearing bush, as in the case of the thick cylindrical outer sleeve) by cutting out the inner surface of the outer sleeve in the axial direction or by press work on the outer surface in the radial direction. That is, by the former method it is impossible to provide the said convex portions, because the thin outer sleeve has not enough thickness for forming the said convex portions by the cutout method on the inner surface of the outer sleeve. By the latter method, it is difficult to obtain accuracy in the concentricity of the cylindrical surface, which is in contact simultaneously with the convex portions of the inner surface of the outer sleeve, for the outer surface of the outer sleeve, because the said convex portions can not be formed with precision by radial press work from the outer surface. Also, it is difficult to correct the accuracy of the concentricity and the cylindrical shape etc by the grinding process. For that reason, in the case of existing bearing bushes which consist of a thin cylindrical outer sleeve, the axially extending apertures with curved portions at both ends are provided by the punching press within the range of the circulations of the balls, after the said outer sleeve has been formed by the deep drawing of the thin plate in the cylindrical form, so as to provide the space necessary to circulate the balls, and the width of the said provided apertures on the outer sleeve is made slightly smaller than the diameter of the ball so that the balls will not fall from the bearing bush. But in the case of the said thin cylindrical outer sleeve, as the said long apertures are formed by the punching process with great precision, it is impossible during the said punching process to avoid a decrease in the accuracy in the shape and in the dimension of the outer sleeve, which is formed by deep drawing with great precision. The entry of dust from the said apertures of the outer sleeve into the bearing bush, and in particular the entry from the said apertures of the strong binding material which is often used, when the bearing bushes are clamped by the housing holes, obstructs the performance of the bearing bushes. Still more in the case of the thin cylindrical outer sleeve, the methods of clamping of the ball retainer, which are necessary to circulate the balls, are remarkably limited in contrast with the thick cylindrical outer sleeve, and the selection of suitable shapes for the ball retainers becomes difficult.

In constructing existing bearing bushes with the thin cylindrical outer sleeve containing the said apertures, the thick cylindrical ball retainer is adopted, fitting into the inside of the outer sleeve without any clearance, and the spaces which are necessary for circulating the balls are formed by the said apertures, and not by the said axially extending convex portions of the inner surface of the outer sleeve. And in the case of the said construction of the bearing bush, the balls which are provided in the oblong ball circulating grooves of the outer surface of the cylindrical ball retainer come in contact with the inner surface of the outer sleeve within the ranges of circulation of the balls, and so the fitting of the inner sleeve into the outer sleeve is impossible without deformation of the said inner sleeve of the retainer within the said ball circulating ranges.

So that in the case of the said existing bearing bushes with a thin cylindrical outer sleeve, the assembly of the bearing bush is possible with the retainer only made of plastic material, which can easily accept some slight elastic deformation. But with a retainer made from plastic material, the applications of the bearing bush are limited, since the strength of the retainer decreases and the range of the permissible temperatures is reduced.

Moreover, there are other methods of making the outer sleeve of the bearing bush, where the outer sleeve is shaped with thin or thick plates by bending to a cylindrical form. With the said thick cylindrical outer sleeve made from a thick plate, the axially extending convex portions of the inner surface are formed by means of radial pressure from the outer surface. With a thin cylindrical outer sleeve made from a thin plate, the axially extending apertures are formed by the punching press, so as to provide the said ball circulating space in the bearing bush. But with these working methods, it is very difficult to make the outer sleeve with the great precision which is necessary for these kinds of bearing bushes. With the outer sleeve made by these methods, the strength of the outer sleeve is less than that of the cylindrical outer sleeve made by other working processes, and the methods of clamping the ball retainer to the outer sleeve become too complicated. The outer sleeve of the invention, as shown in FIGS. 3 and 4, has the thin cylindrical form, with the axially extending convex portions on the inner surface. In this case the outer sleeve of the invention has the following features.

a. The improvement of the accuracy of the bearing bush. The accuracy of this kind of bearing bush is mostly dependent on the accuracy of the outer sleeve and the balls. Therefore, the performance of the bearing bush is greatly influenced by the accuracy of the outer sleeve. In the outer sleeve of the invention, the main feature is that the cylindrical outer sleeve is formed by the deep drawing method from a thin plate, and in the three or more circumferentially spaced positions of the inner surface of the outer sleeve, the axially extending convex portions are also formed at the same time by the said deep drawing method.

That is, the width of the said convex portions 6 of the inner surface, as shown in FIGS. 3 and 4, is almost the same as the diameter of each ball, and the sum of the width of the said convex portions and the circumferential length of the inner surface of the outer sleeve in the ratio of 1/5 – 1/10. And with the said deep drawing method, the influence of the simultaneous formation of the said convex portions with a uniform radial thickness in the outer sleeve can be diregarded, since the said convex portions are formed with the same distance circumferentially on the inner surface of the outer sleeve. Therefore if the shapes and dimensions of the punch and the die are formed with precision, and the relative position of the punch and the die is precisely maintained the accuracy of the thickness of the outer sleeve and the heights of the said axially extending convex portions of the inner surface are precisely obtained. So that the concentricity of the cylindrical surface, which is simultaneously in contact with the said convex portions of the inner surface of the outer sleeve, to the outer surface of the outer sleeve is obtained with precision, and with this, the concentricity of the bearing bush to the working shaft is also obtained precisely, since the dimensional accuracy of the ball diameter is usually achieved to the highest degree.

For the outer surface of the outer sleeve, it is easy to achieve cylindrical accuracy with the greatest precision by the said deep drawing method using precisely-made tools (punch and die).

In the case of the inner surface of the outer sleeve formed by the deep drawing method, it is difficult to obtain cylindrical accuracy with precision, since the punch must be formed with a slight taper on the cylindrical outer surface, in order to get rid of the worked piece from the punch. In the case of the inner surface of the outer sleeve of the invention, it is acceptable to have a taper of 0.02–0.05mm in accordance with the axial length of the bearing bush, except for the axially extending convex portions 6, shown in FIGS. 3 and 4, as the cylindrical accuracy of the said inner surface has no direct influence on the accuracy of the bearing. As the area of the inner surface of the outer sleeve, except the said convex portions, is 5–6 times the area of the said convex portions, it is therefor easily possible to get rid of the worked piece from the punch without any tapering of the said convex portions. Therefore the cylindrical accuracy of the cylinder which is in contact with the axially extending convex portions of the inner surface of the outer sleeve, is simultaneously obtained with great precision. In the outer sleeve of the bearing bush of the invention, a side wall 8, shown in FIGS. 3 and 4, is provided in the axial end position of the outer sleeve. In the other axial end position of the outer sleeve, a simple cylindrical part, which does not have the convex portions 6 of the inner surface, is provided. These two features, i.e. the said wall 8 and the simple cylindrical part of the outer sleeve, are calculated to prevent the deformation of the outer sleeve after the said deep drawing, and especially after the heat treatment (quenching and annealing etc). That is, the said wall and the simple cylindrical part are effective in preventing the deformation of the outer sleeve after the convex portions are formed simultaneously during the deep drawing process and are also effective in maintaining the accuracy of the dimensions and the shape of the outer sleeve after the heat treatment. The outer sleeve of the bearing bush of the invention is formed into a thin cylindrical shape which is different from the thick cylindrical outer sleeve, which is characteristic of existing bearing bushes. After the assembly of a bush, with the said thin cylindrical outer sleeve, some slight deformation of the said outer sleeve is permissible, and so it is one of the great features of the bearing bush of the invention that it can be adapted to fit into the precisely-made hole and the shaft. Therefore, with the bearing bush of the invention, by providing a precise thin cylindrical outer sleeve without the grinding process after the heat treatment, it is easy to obtain a bearing bush of great precision, under the correct working conditions.

b. Rationalization of Construction. The bearing bush of the invention, as shown in FIGS. 1–6, consists of balls, the thin cylindrical outer sleeve and the thick cylindrical ball retainer, and it is different from existing bearing bushes, (which have a thin cylindrical outer sleeve) in that it has axially extending convex portions on the inner surface of the thin cylindrical outer sleeve, so that the ball paths of the circulating balls in the bearing bush are rationally provided. That is, in the case of existing bearing bushes, which have a thin cylindrical outer sleeve without the said axially extending convex portions, axially extending apertures on the outer sleeve have to be provided, in which the balls circulate and do not come in contact with the shaft. These axially extending apertures are formed with the punching press after the deep drawing of the outer sleeve. In this case, the decrease in the accuracy of the outer sleeve, (which is due to the deformation caused by the punch press) and the increase of the deformation following the heat treatment, (which is due to the residual stresses caused by the punching press) and also the decrease in the strength of the outer sleeve, (which is due to the formation of the aperture) result in some deterioration in the performance of the bearing bush.

Moreover, with the said apertures, penetration of dust into the bearing bush is accelerated, and, as mentioned above, in the case of assembly with the thick cylindrical ball retainer fitting into the thin cylindrical outer sleeve, (in which there is contact between the balls provided in the ball circulating grooves of the ball retainer and the inner surface of the outer sleeve), the thick cylindrical ball retainer must be made from plastic material which permits some slight elastic deformation.

Figure 5:
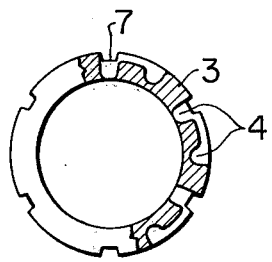
FIG. 5 is a partially transverse sectional view of the ball retainer of antifriction bearing according to the invention.

With the bearing bush of the invention, the said axially extending convex portions of the inner surface of the outer sleeve can be simultaneously formed by deep drawing of the outer sleeve, so as to provide a rational method of producing the bearing bush. In the case of the invention, it is possible to maintain the accuracy of the shape and the dimension of the outer sleeve, without the formation of the said apertures in existing bearing bushes. Also, the penetration of dust from the said aperture into the bearing bush is prevented. As regards the construction of the bearing bush of the invention, with the rational shape of the said outer sleeve and the ball retainer, the fitting and the positioning of the outer sleeve and the ball retainer can be accomplished easily and precisely. That is, on the outer surface of the thick cylindrical ball retainer with a simple shape, as shown in FIGS. 5 and 6, three or more axially oblong guide grooves 4 are provided, corresponding to the axially extending convex portions on the inner surface of the outer sleeve, and also the axially extending grooves 7 are provided, corresponding to the said oblong ball guides 4 on one side of the axially straight portions, where the axially extending apertures 9 are formed. As regards the fitting of the cylindrical ball retainer 3 and the outer sleeve 2, as shown in composite FIGS. 1 and 2, these are mutually fitted without any clearance. The axially extending convex portions 6 on the inner surface of the outer sleeve, and the said axially extending grooves 7 on the outer surface of the cylindrical ball retainer 3 are also fitted simultaneously in the axial direction, so that the positioning of the outer sleeve 2 and the ball retainer 3 in the radial and circumferential directions is obtained with the greatest firmness and precision.

In the case of the fitting of the outer sleeve and the ball retainer, the problem of the balls, which are situated in the guide grooves 4 of the ball retainer, coming in contact with the inner surface of the outer sleeve is solved. Thus, a slight space is provided in the curved portions of the oblong ball circulating groove in which the balls do not come in simultaneous contact with the shaft and the axially extending convex portions of the inner surface of the outer sleeve. Therefore, the material of the thick cylindrical ball retainer of the invention is not limited to that which permits some slight elastic deformation, as in the case of the said existing bearing bushes which have a thin cylindrical outer sleeve. In the case of the bearing bush of the invention, the thick cylindrical ball retainer can be made from such material as metal, plastics, etc, by metal cutting, forging, metal or plastic extrusion, and by metal powder metallugy etc.

Figure 7:
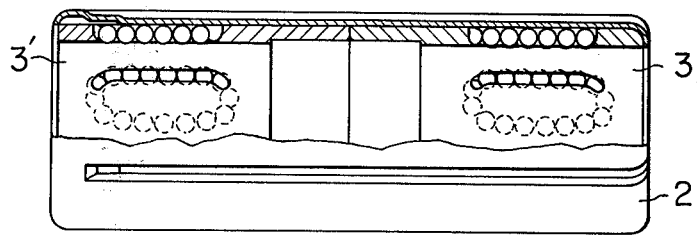
FIG. 7 is the second embodiment of the invention in which two guide grooves are axially arranged in the axially long ball retainer.

The outer sleeve of the bearing bush of the invention can be made with great precision (after the formation of a thin cylindrical shell by the deep drawing process with a thin plate), by heat treatment only (quenching and anealing etc) without the grinding processes, excluding the wall 8, shown in FIG. 4, which is formed by a punching press in the bottom of the thin cylindrical shell, and by the cutting off of the cylindrical shell at the other axial end, (so as obtain the axially constant length of the outer sleeve), and also excluding the formation of the slightly tapered portions 6'' of the axially extending convex portions 6 on the inner surface by the metal cutting process. The axially slight difference of the thickness of the thin cylindrical outer sleeve, due to the slight taper of the punch, which is necessary to get rid of the worked piece from the punch by the deep drawing process as mentioned above, does not affect the performance of the bearing bush. So that, in the case of the deep drawing process, as shown in FIG. 7, it is possible to make the outer sleeve axially longer than usual, and to form an axially long bearing bush, by arranging the said thick cylindrical ball retainers, (which are mutually separate with the individual ball circulating grooves on the outer surface), on the inner surface of the outer sleeve in the axial direction.

Thus, construction of the bearing bush can be obtained only by the use of the said axially long outer sleeve of the bearing bush of the invention, which has the following special features, i.e., when using the bearing bush, by fitting it to the working shaft at the axial end, and by applying the load at the other end of the shaft, it is very difficult to maintain the minimum values of the radial displacement at one end of the shaft, where the load acts in a radial direction. Accordingly, the moment load acts concentrically on the bearing bush at both axial ends on the few balls which are in symmetrical position. The tendency of the load to concentrate on a few balls of the bearing bush is remarkable, because of the rather small range of the axially extending load carrying portions, where the balls roll in bearing contact with the shaft and with the inner surface of the outer sleeve of the bearing bush. The length of the said range is usually ½–⅓ of the length of the bearing bush in the axial direction. With the deformation of the said load carrying balls, and also the deformation of the outer sleeve of the bearing bush and the working shaft in the load carrying positions under the said moment load, it is frequently impossible to maintain the displacement of the load acting at the end of the shaft within the permissible limits and to avoid the acceleration of the damage to the bearing bush. For this reason, the two bearing bushes are used in an axial arrangement, so as to decrease the load due to the said moment, by extending the length in which the concentrated load acts in the bearing bush. But in bearing bushes of this kind, because the dimensional variation in the diameter of the working shaft, which fits into the bearing bush in any clearance, is between 0.005–0.020mm and also because the dimensional variation of the diameter of the outer surface of the outer sleeve is between 0.007–0.025mm respectively in accordance with the size of the bearing bushes, and because the accuracy of the concentricity of the said working shaft and the outer surface of the outer sleeve of the bearing are different from each other in each bearing bush, it is impossible to set and to combine axially the two bearing bushes with the same or no clearance between the working shaft and the bearing bush, even though the housing hole and the shaft are made with the greatest precision. With the construction of the bearing bush of the invention, as shown in FIG. 7, because the outer sleeve does not come apart in correspondence with the two thick cylindrical ball retainers in the axial direction, it is easy to solve the technical difficulty of the said decrease of accuracy between the working shaft and the bearing bush, due to the said combination of the two bearing bushes and the influence of the dimensional variation in the dimension and the shape of each bearing bush. Moreover, it is also possible to increase the accuracy of the setting of the bearing bush in the housing hole, and to improve the setting conditions of selected clearance between the working shaft and the bearing bush, in order to minimize the deflection of the working shaft on the load acting end. Consequently, for the said reason, it is possible to decrease the cost of operation by using this bearing bush, as compeared with that of two existing bearing bushes, and it is also possible to decrease the cost of assembly, so that the process by which the bearing bush is fitted to the housing hole, can be easily accomplished.

Moreover, there are other additional features as compared with existing bearing bushes. FIGS. 8 and 9 show one such example, i.e. the axial positioning method which can be applied to the bearing bush of the invention, between the outer sleeve and the ball retainer. With the bearing bush of the invention, the positioning method of the ball retainer in relation to the outer sleeve in the circumferential direction has already been mentioned above, and the positioning in the axial direction has been also explained, as it is easy to perform by the usual technical method. That is, with the said wall 8, shown in FIGS. 3 and 4, which is formed at the axial end of the outer sleeve, after the fitting of the thick cylindrical retainer to the outer sleeve, the axial positioning of the ball retainer to the outer sleeve is maintained by the formation of the slightly curved portion on the other circular end, or by the suitable use of a snap ring etc. With the exception of the said usual technical methods of positioning in the axial direction, FIGS. 8 and 9 show one such way of positioning in the axial direction, in accordance with the constructional features of the bearing bush of the invention. In FIG. 9, 10 is an annular groove situated on the axial end of the outer sleeve 2, 11 is the convex parts formed on the axial end of the outer surface of the cylindrical ball retainer, and 12 is the slight concave parts formed also on the axial end of the outer surface of the ball retainer.

The inside diameter of the cylindrical surface, which is simultaneously in contact with said convex parts 11 of the outer surface of the ball retainer 3, is made greater than the diameter of the inner surface of the outer sleeve 2, and is made the same or slightly smaller than the inside diameter of the groove 10. Therefore in the case of the assembly of the bearing bush of the invention, and in the case of the fitting of the ball retainer 3 from the axial end, which does not have the said convex part 11 in the axial direction on the outer sleeve, the said convex parts 11 come in contact with the axial end of the inner surface of the outer sleeve. So that, in the case of such contact of the said convex parts 11 with the inner surface of the outer sleeve with the pressure of the retainer 3 against the outer sleeve 2, the thin cylindrical outer sleeve easily comes within the slight deformation of the said axial end section. After the convex parts 11 have become embedded in the inner surface of the outer sleeve, the deformation of the axial end of the outer sleeve is restored to its original state. The said convex parts 11 and the concave parts 12 of the axial end of the cylindrical ball retainer are easily shaped, for example, by the extrusion process using zinc alloy or plastic material, to form the shape of the die which corresponds to the shape of the said convex and concave parts. In the case of the bearing bush of the invention, with the rational construction of the bearing bush, it is possible to simplify the axial positioning of the ball retainer to the outer sleeve by the process of assembly, and also to increase the efficiency of operation.

Moreover, in the case of the bearing bush of the invention, the thin cylindrical outer sleeve, corresponding to the diameter of the working shaft, has a smaller diameter than the diameter of the thick cylindrical outer sleeve provided in existing bearing bushes. So that, the defect of the antifriction bearing bush, caused by the need for a larger diameter of the housing hole than that of the housing hole in the usual type of metal bush, can be corrected. In contrast with existing bearing vushes which have a thick cylindrical outer sleeve, the bearing bush of the invention does not need the axial positioning rings on both sides of the outer sleeve, so that it is possible to increase the bearing load with the increase of the axially rolling range of the load carrying balls. With the formation of the said axially extending convex portions on the inner surface of the outer sleeve, the rigidity of the outer sleeve is increased in the axial direction, as compared with existing bearing bushes, which have a thin cylindrical outer sleeve, and the strength of the bearing bush is also increased.

c. Improvement in performance of the bearing bush. With the thin cylindrical outer sleeve of the bearing bush of the invention, the axially extending convex portions on the inner surface of the outer sleeve are formed simultaneously by the deep drawing of the outer sleeve. Therefore, the shape of the said axially extending convex portions, as shown in FIGS. 10 and 10', with ball contacting radius $r$ and a V shape, is formed by the deep drawing process, in accordance with the selection of the shapes of the axially extending grooves on the outer surface of the punch, and the selection of the shape of the convex portions on the inner surface of the die.

Generally, the more the groove radius $r$, as shown in FIG. 10, approaches the ball radius, the more the shape of the axially extending convex portions 6 approaches the shape of the groove. In order to provide the groove with the said radius $r$ or the V shape, as shown in FIGS. 10 and 10', on the axially extending convex portions 6, the load carrying condition of the bearing bush, which is different from the load carring condition of existing bearing bushes (which have the shape of $r = R$, as shown FIG. 10) on the axially extending convex portion 6, is particularly improved. Therefore, with the bearing bush of the invention, the static and dynamic load carrying capacity, and the performance of the bearing bush are more than a match for existing bearing bushes.

In the case of existing bearing bushes which have axially extending convex portions on the inner surface of the outer sleeve, as regards the shape of the said convex portions in the circumferential direction, as shown in FIG. 10, the radius R has the same center as the center of the outer surface of the outer sleeve, and also the same center as the outer surface of the shaft which is fitted to the bearing bush. So that in the circumferential direction, the balls which roll in bearing contact with the said convex portions of the inner surface of the outer sleeve and the shaft, are not restricted by the said outer sleeve and the shaft, and are restricted only by the guide grooves of the ball retainer. In these circumstances, the said guide grooves of the ball retainer need some clearance, so as to maintain the free rolling of the balls, and the said clearance is made larger than the necessary minimum, because of the dimensional variation of the ball retainer. Therefore, the balls which are in bearing contact, roll within the said guide grooves in such a way, as to be in contact with each other, and so they meander in the axial direction in rolling contact with the said convex portions and the shaft, and not in a straight line arrangement in the axial direction. With the use of these kinds of bearing bushes, it is very difficult to maintain precisely the guide for the linear motion under the above mentioned bearing conditions. With the bearing bush of the invention, within the load carrying range of the axially extending convex portions on the inner surface of the outer sleeve, it is possible to form the said convex portions in the shape of the axially extending grooves, so as to arrange and roll the balls in the line of the axial direction, so that movement is restricted to the circumferential direction of the bearing bush, and the guiding conditions of the shaft can be maintained very precisely. Moreover, the said tendency, in which the balls are arranged in the line of the axial direction, is accelevated with the increase of the load, which acts on the bearing bush in the radial direction, so that it is possible to avoid the destruction of the bearing bush which is due to the widening of the guide groove of the ball retainer under the increased load, and also to raise the performance of the bearing bush to a high level.

With the bearing bush of the invention, as mentioned above, the load carrying capacity can be increased by the formation of the grooves of the axially extending convex portions on the inner surface of the outer sleeve. Further, it is also possible to increase the load carrying capacity of the working shaft by means of the improvement of the bearing contact between the shaft and the balls, for example, by the formation of the axially extending grooves of the three or more circumferential positions of bearing contact on the outer surface of the shaft. But with existing bearing bushes, it is very difficult, and usually impossible to make the linear motion guide way using the bearing bush and the shaft, on which the said axially extending grooves are provided, without ball sprain.

With the bearing bush of the invention, as shown in FIGS. 11 and 12, it is easy to obtain the above mentioned bearing construction. That is, in FIGS. 11–12, 1 is the ball, 2 is the outer sleeve, 3 is the ball retainer, and the basic construction of the bearing bush is the same as the construction of the bearing bush of the invention, as shown in FIGS. 1–10, except that (1) the guide grooves 14 of the balls are formed on the outer surface of the fitted shaft, (2) corresponding to the said grooves 14, the axially extending convex portions 15 of the inner surface of the thick cylindrical ball retainer are provided, so as to make the ball circulation smooth, and to construct the ball circulating grooves easily, and (3) the axially extending convex portions 15' on the inner surface of the cylindrical ball retainer are formed, because, within the parts of the ball circulating grooves, thickness of the ball retainer is lacking with the formation of the axially extending grooves 14 of the shaft, and the axially extending grooves 14' on the outer surface of the shaft are also formed, corresponding to the said convex portions 15' so as to fit the bearing bush and the shaft.

That is, as shown in FIGS. 11 and 12, with the axially extending convex portions 15 on the inner surface of the ball retainer, it is possible to form the guide grooves, so as to obtain smoothness in the rolling of the balls which are leaving the bearing contact from the said grooves 14 of the shaft, or which are coming in contact with the said grooves 14 after circulation. With the axially extending convex portions 15' on the inner surface of the ball retainer, it is possible to compensate for the decrease of the thickness which is due to the formation of the said guide grooves 14 of the shaft, and to maintain the strength of the ball retainer, with the bottom of the ball circulating grooves within the axially straight range. The method of making the said ball retainer with the axially extending convex portions 15 and 15' as shown in FIG. 11, is the same as in the case of the ball retainer shown in FIGS. 5 and 6. For example, in the case of the inner sleeve, the ball retainer is made from metal or plastic material by the extrusion process. The said axially extending convex portions on the inner surface of the retainer are formed by using a die which has axially extending grooves corresponding to the said convex portions 15 and 15'.

The many axially extending grooves on the outer surface of the shaft which is fitted to the bearing bush, are easily formed by the drawing process of the cylindrical shaft, by using the die which has axially extending convex portions corresponding to the said grooves of the shaft, and are also formed by the rolling method etc. Therefore, according to the construction of the bearing of the invention, it is posssible to increase the bearing performance, which is due to the increase of the bearing load carrying capacity and also to increase the life of the bearing bush by means of the formation of the ball rolling grooves of the shaft, which corresponds to the inner sleeve of radial antifriction bearings. Moreover, with the bearing constructiion of the invention with the above mentioned ball rolling grooves of the shaft, and the convex portions on the inner surface of the outer sleeve, the circumferential relative movement of the bearing to the shaft is firmly restrained. So that the said bearing bush of the invention can be used as a ball sprain, because the bearing bush and the shaft can transmit the torque of the rotation of the shaft or the bearing bush correspondingly. Moreover, the bearing bush and the shaft can maintain the axial movements with rolling contact of the balls. FIGS. 13 and 14 show one example of the application of the bearing bush of the invention in which it is applied to the shaft of the gear train, i.e., in the drawing, 1 is the ball, 2 is the outer sleeve, 3 is the cylindrical ball retainer, 13 is the shaft, which usually transmits the torque of the rotation, 16 is the gear fitted to the outer sleeve of the bearing bush, and 17 is the snap ring, which is used for positioning of the bearing bush to the gear in the axial direction. As shown in FIGS. 13 and 14 the circumferential positioning of the bearing bush to the gear can be obtained firmly by the fitting of the axially extending concave portions on the outer surface of the outer sleeve of the bearing to the axially extending convex portions 18, which are provided on the inner surface of the housing center hole of the gear 16, or by the use of the key to the said axially extending concave portions on the outer surface of the outer sleeve. The axial positioning of the bearing bush to the gear, as shown in FIGS. 13 and 14, can also be easily obtained by the use of the snap ring 17 in one axial end of the outer surface of the outer sleeve of the bearing, after the fitting of the bearing bush to the housing hole of the gear.

According to the bearing bush of the invention, with the basically rational construction, it is not only possible to realize a bearing bush with a high performance, but also easily to extend the use of bearing bush as the ball sprain. The positioning of the bearing bush to a rotatory machine element like the gear, in axial and circumferential directions, is also easily obtained. Moreover, the circumferential positioning and the fixing of the bearing bush to the housing hole are obtained with the fitting of the said axially extending concave portions to the axially extending convex portions of the housing hole, the convex portions of the inner surface of the outer sleeve are strengthened, and the load carrying conditions of the bearing bush are improved.

Besides, with the bearing bush of the invention, according to the above mentioned rationalization of the construction of the bearing bush, the diameter of the outer sleeve can be made smaller than the diameter of the outer sleeve of existing bearing bushes, which have the same diameter in the shaft which is fitted to the bearing bush, and it is also possible to obtain the smallest bearing bush which can be fitted to the smallest diameter shaft, for example fitted shafts with a diamter of 2–3mm.

Summarizing the description, the object of the invention, with the bearing bush which can support the axially reciprocating shaft with the many circulating balls between the shaft and outer sleeve, is to realize this kind of bearing bush with the simplest construction and the highest performance, as compared with existing bearing bushes, and also to obtain an increase in the performance of the machinery which necessitates the use of a bearing bush.

What I claim is:

1. An antifriction bearing bush comprising a thin cylindrical outer sleeve having an end wall and at least three equidistant axially extending convex portions formed on the inner surface thereof except for one end, a cylindrical ball retainer fitting within said thin cylindrical outer sleeve having at least three axially oblong grooves on the outside thereof, the said oblong grooves being composed of two straight sections and two curved sections, one of said straight sections and an adjacent portion of each curved section being cut completely through said ball retainer, said straight section also having extended straight sectional grooves reaching the ends of said cylindrical ball retainer, the depth of said straight sectional grooves being complementary to said convex portions on said outer sleeve, two segments of said convex portion of said outer sleeve which overlie the ends of said straight section of said ball retainer being of less convexity than the remainder of said convex portion, balls within one portion of said oblong grooves which contact said convex portion and simultaneously extend beyond the inner surface of said ball retainer and balls within the remaining portion which are enclosed by the ball retainer and said outer sleeve, and means within the end of said sleeve not having an end wall to retain said ball retainer within said sleeve.

2. The antifriction bearing bush, as claimed in claim 1, in which two ball retainers are axially fitted into the axially extended outer sleeve.

3. The antifriction bearing bush as claimed in claim 1, wherein said sleeve has at one end thereof a circular groove and said ball retainer has at one end thereof protuberances uniformly distributed therearound to fit into said groove to retain said ball retainer in said sleeve.

4. An antifriction bearing bush as claimed in claim 1, including a shaft having axially extending grooves on the outer surface thereof over which the bearing bush is fitted, said ball retainer having axially extending convex portions on the inner surface thereof, corresponding to both axial straight sections of the grooves on the outer surface of the ball retainer to provide the axially extending grooves on the outer surface of the shaft, corresponding to the said axial convex portions on the inner surface of the outer sleeve and to said axial convex portions on the inner surface of the ball retainer, to provide the axially extending grooves on the outer surface of the shaft, corresponding to said axial convex portions on the inner surface of the ball retainer, and also to provide slight clearances between the said convex portions on the inner surface of the ball retainer and the grooves on the shaft.

* * * * *